J. VON B. LENGERKE & A. VON BEUST.
MULTICOLORING APPARATUS.
APPLICATION FILED JAN. 14, 1911.

1,022,956.

Patented Apr. 9, 1912.

2 SHEETS—SHEET 1.

Witnesses:
Robert Everett

Inventors:
Justus von B. Lengerke
Anton von Beust

J. VON B. LENGERKE & A. VON BEUST.
MULTICOLORING APPARATUS.
APPLICATION FILED JAN. 14, 1911.
1,022,956.
Patented Apr. 9, 1912.
2 SHEETS—SHEET 2.
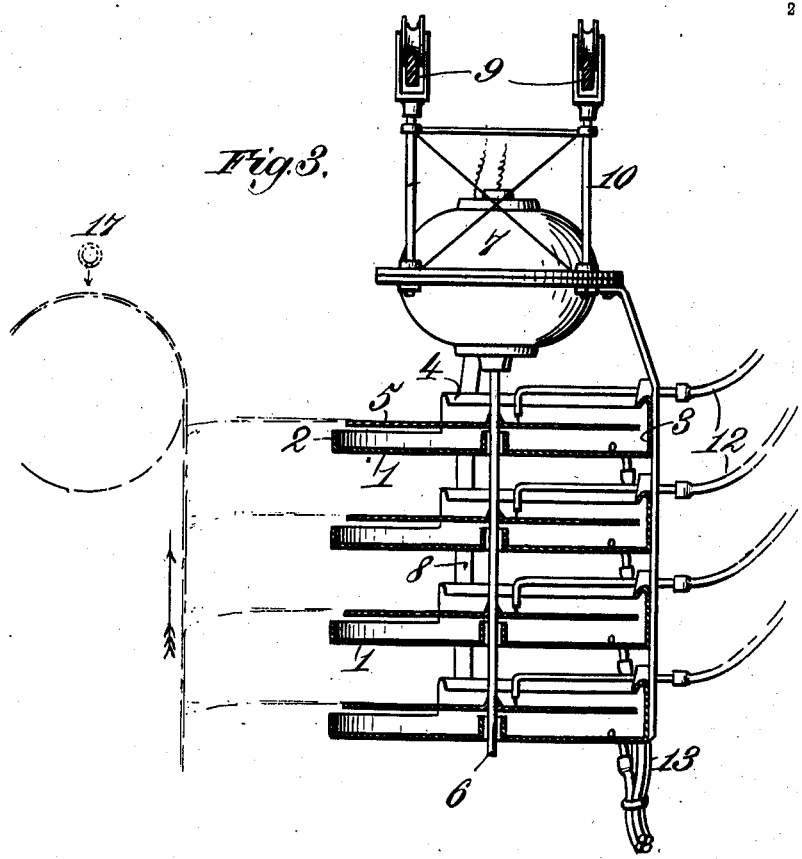
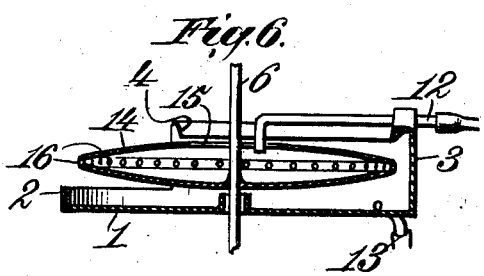

UNITED STATES PATENT OFFICE.

JUSTUS VON B. LENGERKE AND ANTON VON BEUST, OF ORANGE, NEW JERSEY.

MULTICOLORING APPARATUS.

1,022,956.          Specification of Letters Patent.          Patented Apr. 9, 1912.

Application filed January 14, 1911. Serial No. 602,686.

*To all whom it may concern:*

Be it known that we, JUSTUS VON B. LENGERKE and ANTON VON BEUST, citizens of the United States, residing at Orange, in the county of Essex and State of New Jersey, have invented new and useful Improvements in Multicoloring Apparatus, of which the following is a specification.

The present invention relates to improvements in the art of coloring paper, fabrics and other materials, and it has for its object to provide an improved apparatus whereby multi-color, marbleized and mottled effects may be produced effectively and with facility, these effects according to the present invention being produced by feeding the different colors to revolving disks and causing the colors to be projected centrifugally from the respective disks and upon the material to be treated, the colors being thereby deposited upon the material and after being so deposited they may be distributed or spread by air blasts or other suitable means.

To these and other ends, the invention consists in certain improvements, and combinations and arrangements of parts, all as will be hereinafter more fully described, the novel features being pointed out particularly in the claims at the end of the specification.

Figure 1:
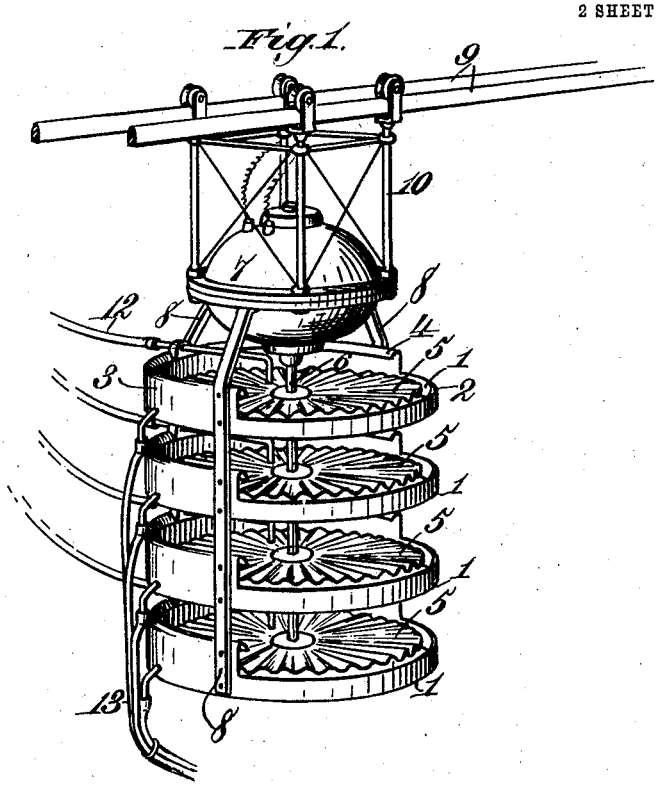
Figure 2:
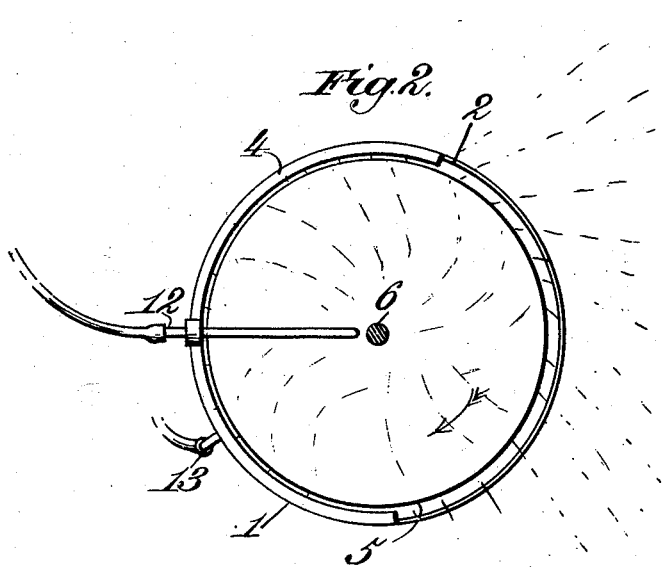

In the accompanying drawing:—Figure 1 is a perspective view of an apparatus of this character constructed in accordance with one embodiment of the invention; Fig. 2 represents a top plan view of one of the disks and guards of the apparatus illustrating diagrammatically the manner in which the coloring matter is deposited upon the material to be treated; Fig. 3 represents a central vertical section through the apparatus showing the same adapted to produce multi-color effects, the web of material to be treated being shown by dotted lines; Figs. 4 and 5 are perspective views of two forms of disks that may be used; and Fig. 6 represents a central vertical section through one of the guards and disks, the latter being in the form of a receptacle having a perforated periphery.

Similar parts are designated by the same reference characters in the several views.

According to the present invention the apparatus embodies units which correspond in number to the number of colors to be used, that is to say, there is a distributing disk and guard for each color. These units are united and the several disks are driven by a common motor. In the present instance, the apparatus embodies a set of units each of which comprises a pan 1 which is preferably circular in form and has a shallow flange 2 at one side and a relatively higher flange 3 at the opposite side, the flange 3 serving as a guard to prevent the coloring matter from being discharged from the corresponding side of the disk. To prevent the coloring matter from rising at the inner side of the flange 3 and overflowing its upper edge, a lip 4 is preferably formed at the top of the flange 3 and is directed inwardly and downwardly. This lip will serve to return the material to the pan. A distributing disk is arranged to revolve in each pan, all the disks being preferably fixed to revolve with a common driving shaft 6 and the driving shaft is operatively connected to a motor 7 which serves to spin or revolve the disks at the necessary speed to project the coloring matter therefrom by centrifugal force. The several pans composing the different units of the machine may be connected and held in proper relation by a suitable number of braces 8, the upper ends of these braces being rigidly secured to the casing of the motor.

To facilitate the placing of the apparatus in operative position with respect to the machine which feeds, manufactures or otherwise handles the material to be colored, it is preferable to employ a trolley upon which the apparatus is suspended. This trolley in the present instance comprises a pair of tracks 9 and the motor has a frame 10 the upper portion of which is provided with trolley wheels 11 which are adapted to travel upon the tracks 9.

A pipe 12 is provided for each unit of the machine, these pipes leading from tanks or other receptacles containing the different coloring materials and each pipe discharges the coloring matter upon its corresponding disk at a point near its center. The coloring matter received by each pan is collected thereby and is returned to a suitable tank or receptacle by a drain pipe 13.

In Fig. 1, the apparatus is shown equipped with radially corrugated disks 5 while in Fig. 3, it is equipped with flat or plain disks 5ᵃ. Either style of disk may be used as desired or necessary. Moreover, a hollow disk such as shown in Fig. 6 may be used. In this latter instance the disk is in the form of a shell 14 which is flattened in the plane of its rotation, it being closed at the bottom and fixed to the driving shaft 6 and its upper side is formed with an opening 15 through which the coloring matter is introduced into the chamber formed within the disk. The periphery of the disk has discharge apertures 16 of a suitable number and size formed therein and in this form of the invention, the material is projected through these peripheral apertures instead of from the upper surface of the disk, as in the preceding constructions.

In producing multi-color, marbleized or mottled effects upon paper, the apparatus is preferably positioned so that the disks will deposit the different colors upon the web of pulp while the latter is traveling in the form of a web toward one of the rollers of the machine, and the colors so deposited may be distributed or spread by blasts of air from a perforated pipe 17.

What is claimed is:—

1. An apparatus for distributing coloring and other liquids comprising a member mounted to revolve in a substantially horizontal plane, means for feeding the liquid to be distributed to said member, means for revolving said member at a speed sufficient to discharge such liquid therefrom by centrifugal force, and a pan having a bottom arranged beneath said member and a peripheral flange to form a collecting receptacle, said flange at one side of the axis of said member being extended above the plane thereof and the flange terminating below the plane of said member at the opposite side of its axis.

2. An apparatus for distributing coloring and other liquids comprising a disk revoluble in a horizontal plane, means for supplying the liquid to be distributed to the upper surface of said disk, means for revolving the disk at a speed sufficient to discharge the liquid therefrom by centrifugal force, and a collecting pan having a bottom arranged beneath the disk and a peripheral flange extending beyond the periphery of the disk, the flange at one side of the axis of the disk terminating in a plane below the plane of the disk to permit the material to be discharged therefrom and being extended above the plane of the disk at the opposite side of its axis and formed with an overhanging lip to form a guard to intercept the liquid projected from the disk and to direct it into said pan.

3. An apparatus for distributing coloring and other liquids comprising a disk revoluble in a horizontal plane, means for supplying the liquid to be distributed to the upper side of said disk and at a point in proximity to its axis of revolution, means for revolving the disk at a speed sufficient to discharge the liquid centrifugally therefrom, and means for intercepting and collecting the liquid discharged at one side and permitting distribution of the liquid discharged at the opposite side of the axis of the disk.

4. An apparatus for distributing coloring and other liquids comprising a horizontally revoluble disk, a nozzle for supplying the liquid to be distributed to the upper side thereof, means for revolving the disk at a speed sufficient to discharge the liquid centrifugally therefrom, a guard arranged to intercept the liquid discharged at one side of the disk, and having a cut-away portion which exposes a part of the periphery of the disk and means for collecting the liquid intercepted by the guard.

5. An apparatus of the class described comprising a horizontally revoluble disk, a pan arranged below the disk and serving as a collecting receptacle, said pan having a guard for intercepting and collecting liquid discharged at one side of the disk and having an opening which exposes and permits distribution of the liquid discharged from the opposite side of the disk, means for supplying liquid to the upper side of the disk, and means for conducting away the liquid collected by the pan.

6. An apparatus of the character described comprising a supporting frame having means for mounting it upon a trolley, a motor carried by said frame, a shaft operatively connected to the motor, a set of superposed axially alined disks mounted on said shaft, means for supplying liquids to the respective disks, pans individual to the respective disks, each pan having a guard for intercepting the liquid discharged at one side of its corresponding disk and for conducting such liquid to its respective pan, said pans being rigidly connected to and supported by said frame, and means for conducting away the liquids collected in the different pans.

In testimony whereof we have hereunto set our hands in presence of two subscribing witnesses.

JUSTUS von B. LENGERKE.
ANTON von BEUST.

Witnesses:
Thomas McDevitt,
George L. Harrison.